United States Patent [19]  [11] 3,884,971
Goldstein  [45] May 20, 1975

[54] REDUCTION OF CARBONYL COMPOUNDS
[75] Inventor: Theodore P. Goldstein, Yardley, Pa.
[73] Assignee: Mobil Oil Corporation, New York, N.Y.
[22] Filed: Oct. 22, 1971
[21] Appl. No.: 191,806

[52] U.S. Cl.......... 260/535 R; 260/93.5; 260/397.5; 260/473 A; 260/484 P; 260/514 K; 260/521 R; 260/535 P; 260/583 EE; 260/584 R; 260/609 R; 260/618 H; 260/625; 260/631 H; 260/638
[51] Int. Cl............................................. C07c 59/08
[58] Field of Search............ 260/521 R, 521 A, 535, 260/638 B, 618, 473, 484

[56] References Cited
UNITED STATES PATENTS
3,483,219  12/1969  Shepherd ........................ 260/638 B
FOREIGN PATENTS OR APPLICATIONS
433,869  8/1935  United Kingdom............. 260/638 B
803,178  10/1958  United Kingdom............. 260/638 B Primary Examiner—Lorraine A. Weinberger
Assistant Examiner—Paul J. Killos
Attorney, Agent, or Firm—Charles A. Hugget; Raymond W. Barclay; Stanley A. Strober

[57] ABSTRACT

A carbonyl compound, as used herein, including both carbonyl and thiocarbonyl compounds, is reduced to the corresponding carbinol or mercapto compound by reacting the carbonyl compound with a reduced heterocyclic nitrogen compound having a pyridine portion, preferably a dihydropyridine, in the presence of a polyvalent metal ion, preferably a polyvalent metal ion of a group to the right of group 2A of the Periodic Table. Of particular interest as the reducing agents of this invention are N-substituted dihydronicotinamides. The final reaction mixture containing the reduced product is a useful industrial intermediate.

20 Claims, No Drawings

REDUCTION OF CARBONYL COMPOUNDS

BACKGROUND OF THE INVENTION

1. Field of the Invention

This invention relates to a process for reducing carbonyl and thiocarbonyl compounds using a reduced heterocyclic nitrogen compound as the reducing agent and, in particular, it relates to the formation of hydroxy and mercapto compounds from carbonyl compounds and reduced pyridine compounds in the presence of a metal ion as the catalyst.

2. Description of the Prior Art

Reactions between carbonyl compounds and reducing agents in the presence of enzymes are known. In "Mechanisms of Organic and Enzymic Reactions," S. G. Waley, Oxford Press, 1962, pages 204–210, there is described a reaction between a deuterated reduced coenzyme and a carbonyl, such as acetaldehyde, to produce the hydroxy product, i.e. deuteroethanol. Reduced dihydronicotinamides have also been described in reactions with ketoacids in Abeles et al. *Journal of American Chemical Society*, Volume 80, page 5459 (1958). The yields are very low. Prior references disclosing reduction of carbonyl compounds with reduced pyridines, such as dihydronicotinamides, at satisfactory rate in the absence of enzymes have not been found.

SUMMARY OF THE INVENTION

Carbonyl and thiocarbonyl compounds are reduced to the corresponding hydroxy and mercapto compounds by reacting with a reduced heterocyclic nitrogen compound in the presence of a proton-source and a polyvalent metal ion. The process of this invention produces reaction products consisting of alcohols and mercaptans having utility in biochemical reactions and other chemical synthesis.

DESCRIPTION OF SPECIFIC EMBODIMENTS

The carbonyl compounds useful in the reactions of this invention are those having the structure

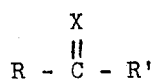

in which X is oxygen or sulfur, and R and R' may each be hydrogen or an organic group, including hydrocarbyl, such as alkyl, cycloalkyl, alkenyl, cycloalkenyl, aryl, alkaryl and aralkyl, or substituted hydrocarbyl or derivatives thereof containing atoms of oxygen, nitrogen, sulfur and phosphorus, such as hydroxy, alkoxy, aryloxy, amino, carboxy, amido, or cyano group or a heterocyclic group or each R or R' may itself be an amino, amido, cyano, carboxy, heterocyclic or an additional carbonyl group. In addition, R and R' may be part of an organic cyclic group of saturated or unsaturated linkages. The organic groups may contain from one to about 40 carbon atoms, and preferably from one to about 20. Included in such categories and of particular interest in this invention are the alpha-keto acids, in which one of the R or R' substituents in COOH and the other is hydrocarbyl or carboxyhydrocarbyl: methyl (pyruvic acid), phenyl (benzoyl formic acid), carboxyethyl (alpha-ketoglutaric), carboxymethyl (alpha-ketosuccinic). However, other carbonyl compounds may be used in accordance with this invention, such as formaldehyde, acetaldehyde, propionaldehyde, benzaldehyde, acetone, methylethylketone, cyclohexanone, benzoquinone, naphthoquinone, keto-steroids, such as testosterone and androsterone, urea and the like. Other non-ketone carbonyl compounds which may be used in the reaction of this invention include other carboxylic compounds, esters, amides, alkali metal, alkaline earth metal and amine salts thereof. Thiocarbonyl compounds include thiourea, methylthiourea, thioacetamide, diphenylthiourea, thiobenzanilide and the like; and thioketones and thioaldehydes.

The reduced heterocyclic nitrogen compounds used in this invention may be any cyclic nitrogen compound having two hydrogen atoms attached to a single carbon atom in the ring. The most preferred compounds are those having a pyridinyl group, as in the following structures

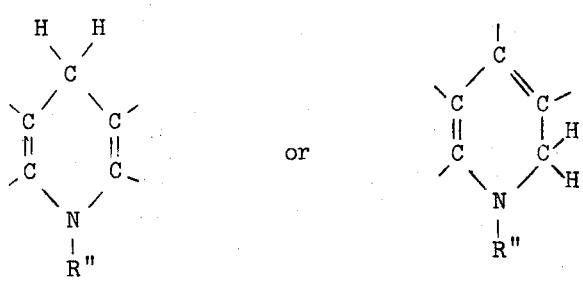

wherein R'' may be hydrogen, hydrocarbyl, cyclohydrocarbyl or derivatives thereof containing oxygen, nitrogen, halogen, phosphorus, silicon and boron, and may contain from one to about 40 carbon atoms for nonpolymer radicals or up to about 300,000 in the case of polymer groups. For the purpose of this invention, R'' may be hydrogen, alkyl, alkenyl, aryl, alkaryl, aralkyl, polyalkyl, polyaryl-alkyl, and the like and these same groups containing oxygen, nitrogen, sulfur and phosphorus atoms as for example, hydroxy, halo, sulfonate, sulfate, phosphate, cyano, amino, imino and carboxy groups, amido groups, imido groups, ether groups, ester groups of organic and inorganic acids, or heterocyclic groups, such as pyridyl, pyrazolyl, pyrrolidyl and quinoxalyl. Specifically, R'' may be ethyl, propyl, hexyl, hexenyl, cyclohexyl, cyclopentadienyl, phenyl, benzyl, naphthyl, tolyl, chlorobenzyl, aminobenzyl, hydroxyethyl, hydroxybenzyl, carboxybenzyl, carboxymethyl, cyanomethyl, methoxymethyl, methoxyethyl, ethoxybenzyl, phosphatomethyl, dimethylphosphatomethyl, sulfatomethyl, methylsulfatomethyl, polyolefinic groups such as polyvinyl and polystyryl, polysiloxyl groups, organoboron polymers and the like, and of particular interest, the combining group of the pyridine nucleotide coenzyme. The remaining positions of the ring, as evidenced by the dangling valences, may be substituted by the same groups as identified for R'' or may be part of a second ring fused to the heterocyclic ring nucleus, providing that at least two hydrogen atoms are attached to a single carbon atom in the nucleus in the ortho or para position to the nitrogen atom as indicated. Thus, the reducing agents of this invention include dihydropyridines, dihydropicolines, dihydrolutidines, dihydroquinolines, dihydroquinaldines, dihydrotoluquinolines, dihydroacridines and the like. (For the purpose of this invention the reduced heterocyclic nitrogen compound will hereinafter also be referred to as the "reduced pyridine" unless specifically identified otherwise.)

Of particular interest is the reduced nicotinamide in which R'' is the phosphorylated radical of the coenzymes NADH and NADPH, and the ring is substituted in the 3-position by an amido group as in the structure

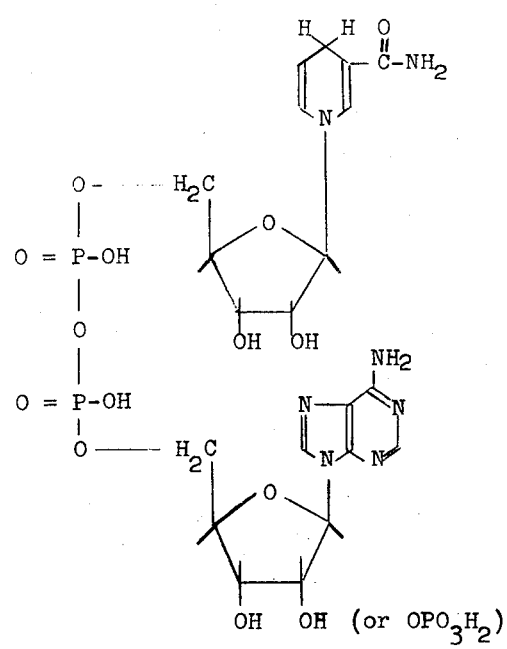

It should be indicated that the term "coenzyme" used to describe this reducing agent is not an enzyme nor does it possess catalytic activity ascribed to enzymes in the prior art. Thus, the only catalytic effect is that of the metal ion. As understood (particularly from "Mechanisms of Organic and Enzymic Reactions" page 205), such reactions have been thought to require an enzyme catalyst. In the absence of any catalyst, enzyme or metal ion, essentially no reaction is detected. (See Bruice and Benkovic, "Bioorganic Mechanisms", W. A. Benjamin Inc., New York, 1966, Vol. II, chap. 9).

In accordance with this invention, the reaction is carried out in the presence of a polyvalent metal ion. Of interest are the metals of groups to the right of Group IIA (the alkaline earth group), especially Groups IVA and B, VIB, VIIB, VIII, and IB to IIIB in the Periodic Table. Metal ions, particularly zinc, cadmium, tin, manganese, cobalt nd nickel, have been found to be very effective catalysts for the reaction in the absence of an enzyme. These metal ions are provided in the reaction mixture initially in the form of metal hydrides or metal salts of halogen acids, nitric acid, sulphuric acid, acetic acid and other ionizable salts.

The reduction of the carbonyl group requires a proton. The reaction of this invention is carried out in the presence of a proton-supplier, most conveniently as the solvent or liquid carrier for the reaction mass, i.e. a protonic solvent or a nonprotonic solvent containing a proton source. The preferred solvents are water, alcohols and acids. However, the reaction may be carried out in any known solvent, including both polar and nonpolar liquids, e.g. benzene, toluene, carbon tetrachloride, provided that water, alcohol or acid is present in the reaction mixture, preferably at a concentration of at least 1 mole per carbonyl group. Suitable alcohols include alcohols of from one to about 20 carbon atoms, and especially methyl, ethyl, propyl, butyl, amyl and hexyl alcohols. Such acids as formic, acetic, benzoic, hydrochloric, sulfuric, organo-sulfonic, nitric, phosphoric, carbonic and the like may be used. Water is especially effective.

The pH has been found to have some effect on the reaction rate. Accordingly, the range of pH's preferred in this invention is held at from about four to about 10 and most preferably from neutral to slightly acidic or basic, i.e. 6.0 to 8.0.

Essentially the reaction of this invention is a hydrogen transfer from the dihydro compound to the carbonyl and is understood to take the following sequence (as illustrated by using a preferred 3-amido-1,4-dihydro pyridine):

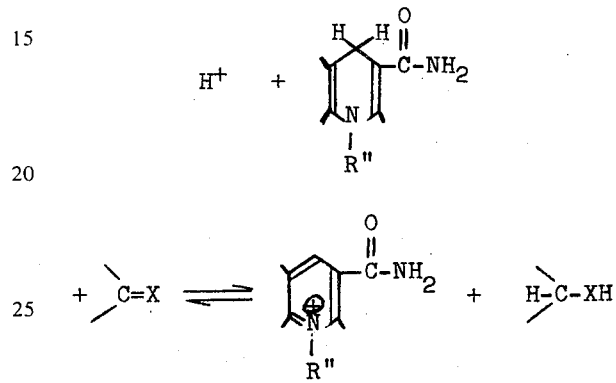

As presently understood, the mechanism of the metal ion catalyst reduction reaction involves activation, perhaps polarization, of the carbonyl bond by the metal ion making the bond susceptible to nucleophilic attack by the hydrogen atom of the reduced pyridine.

The relative quantities of reactants are not believed to be critical to the carrying out of the reaction, only the yield of desired product being affected. The mole ratio of the reduced pyridine to the carbonyl compound may range from 0.05 to about 10 moles of pyridine to 1 mole of carbonyl, and preferably from about 0.1 to about 5 to 1. The ratio of the metal ion equivalents to the total moles of reactants may range from about 0.005 to about 5 to 1, and preferably from about 0.01 to about 1 to 1.

The process of this invention has been discussed in both broad and specific terms. The following specific examples are intended to illustrate said description without limiting the scope thereof.

EXAMPLE 1

Into a flask are added 3 grams (0.02 mole) of benzoylformic acid in 150 ml of 0.1 M N-2-hydroxyethylpiperazine-N'-2-ethanesulfonic acid buffer (HEPES) containing 0.8 gram (0.02 mole) of sodium hydroxide. To this solution is added 0.05 gram (0.0002 mole) of nickelous chloride hexahydrate. The solution is adjusted to a pH of 7.1. To the solution in the flask is added a second solution consisting of 3.2 grams (0.015 mole) of 1-benzyl-1,4-dihydronicotinamide in 100 ml of ethanol. The combined reactions mixture is heated for 20 hours at 70°C. under argon. The resulting mixture is heated under reduced pressure to remove the ethanol and acidified with 3 N HCl. The resulting mixture is filtered to remove minor amounts of an orange precipitate and the filtrate extracted with ether. The ether solution obtained from the extraction is dried over an aluminosilicate (Linde 5A zeolite), concentrated in vacuum and the organic acids which have been extracted therein converted to the methyl ester by reaction with diazomethane.

The resulting methyl ester mixture is separated by liquid phase chromatography using a 6-foot ethylene glycol succinate column. The infra-red and NMR spectra of the material trapped in the column are identical to that of an authentic sample methylmandelate. Analysis indicates that over 4 moles of benzoylformate are reduced per mole of nickel ion.

EXAMPLE 2

In a manner similar to that of Example 1, equimolar quantities of nickelous chloride, benzoylformate and 1-benzyl-1,4-dihydronicotinamide are used. The yield of mandelic acid is about 50 percent of theoretical.

EXAMPLE 3

To a flask fitted with an agitator are added 4 grams (0.006 mole) of the reduced pyridine nucleotide coenzyme, beta-NADH, and 1 gram (0.1 mole) of sodium pyruvate dissolved in 100 ml of distilled water containing 0.05 mole of reagent grade zinc chloride. To the mixture is added a sufficient amount of HEPES buffer to provide a pH of 6.8. The reaction mixture is stirred at 25°C. and constant pH for 3 days in a darkened flask.

At the end of this time, lactic acid is removed from the reaction mixture and identified in a manner similar to that used in Example 1. The yield of lactic acid is about 50 percent of theoretical, and it is optically active.

The reaction is repeated with the same amount of reactants except that zinc chloride is omitted. Essentially, no lactic acid is obtained from the reaction mixture.

In both reactions of this example, the reaction mixture contains no enzyme. This is determined by adding the reaction mixture to culture plates containing mineral agar as nutrient. No microbial growth is detected.

EXAMPLE 4

Into a suitable reactor are added 3 grams (0.02 mole) of alpha-keto glutaric acid and 2.4 grams (0.01 mole) of nickelous chloride hexahydrate dissolved in 150 ml of 0.1 M HEPES buffer. The pH is adjusted to 7.1. To the solution are added 2.4 grams (0.10 mole) of 1-benzyl-1,4-dihydronicotinamide in 60 ml of dioxane. The combined mixture is protected from light and stirred for about 48 hours at 37°C. Dioxane is distilled off under vacuum and 200 ml of 1 N HCl are added.

The resulting mixture is treated in the same manner as in Example 1. The conversion to alpha-hydroxy glutaric acid as determined chromatographically is over 90 percent of theoretical.

EXAMPLE 5

Using tubes sealed under argon as the reactor, reaction mixtures consisting of 0.010 mole of benzoylformic acid and 0.010 mole of the chlorides of magnesium, calcium, barium, cadmium, zinc, tin (2), cobalt (2), manganese (2) and nickel (2) in 10 ml of 0.1 M of HEPES buffer. The pH is adjusted to 7.0. The solution is mixed with 0.010 mole of 1-benzyl-1,4-dihydronicotinamide in 5 ml of dioxane. A 10th tube containing all components except for the metal chloride is also prepared. The tubes are maintained at constant pH and 37°C. for 72 hours. The reactions are stopped by the addition of about 20 ml of concentrated HCl.

The resulting mixtures are treated in the same manner as in Example 1. By chromatographic analysis, mandelic acid is detected in the six tubes containing the cadmium, zinc, tin, cobalt, manganese and nickel chlorides; but not in the 10th tube nor in those containing calcium, magnesium and barium chlorides.

EXAMPLE 6

Using a procedure similar to that of Example 1, the reaction solution of 0.02 mole of benzoylformic acid, 150 ml of HEPES buffer with 0.02 mole of sodium hydroxide and 0.0002 mole of nickel chloride catalyst is prepared. To this solution is added 0.015 mole of a 1,4-dihydronicotinamide-methylated styrene polymer, the styryl-methylene being attached to the ring nitrogen atom.

The nicotinamide-polymer reactant is produced by reacting nicotinamide with a chloromethylated crosslinked macroreticular polystyrene having a minimum molecular weight of about 500,000. The reaction is carried out in dioxane, by heating the reaction mixture at reflux for 5 hours. The ratio of nicotinamide to polymer is a 1-mole excess of nicotinamide per chloromethyl group. At the end of the reaction, the dioxane and excess nicotinamide are removed by filtration and the remaining polymer is washed in hot ethanol at 50°C. The resulting polymer is a poly(N-substituted nicotinamide)chloride salt. This salt is washed in sufficient aqueous sodium dithionite to produce the 1,4-dihydronicotinamide polymer product. This product, a yellow solid having the typical ultra-violet absorption characteristics of 1,4-dihydronicotinamides, is washed with water to remove the dithionite, dried and added to the above solution (without the ethanol of Example 1).

After heating the reaction mixture as in Example 1, the resulting mixture is filtered to remove the nicotinamide polymer. The remaining mixture of hydroxyacid, buffer, metal ion and unreacted acid are worked up in the same manner as in Example 1. Mandelic acid is produced.

EXAMPLE 7

To the reaction solution of Example 3, consisting of 0.1 mole of sodium pyruvate dissolved in 100 ml of distilled water containing 0.05 mole of zinc chloride is added 0.006 mole of a beta-NADH-polystyrene reaction product.

The polymer is prepared by reacting the pyridine nucleotide coenzyme with a polymer obtained by reacting the polystyrene of Example 6 with nitric acid and the nitrated polymer is reduced to the corresponding amino-polystyrene. This intermediate is converted to a diazonium polymer ion by reaction with sodium nitrite in 3N hydrochloric acid. The resulting polymer is reacted with the NAOH, using a 1-mole excess of NADH per diazonium, by mild heating of the two reactants. It is understood that the styryl-azo groups are attached to the NADH molecule in an adenine group.

HEPES buffer is added to the reaction mixture as in Example 3, and the mixture is maintained as described in that example. After filtering off the polymer, optically active lactic acid is separated in a manner similar to that of Example 1.

The polymeric forms of the reduced pyridinium compounds, as used in Examples 6 and 7, are understood to be novel compounds. By reacting heterocyclic nitrogen compounds with ionic forms of a polyolefinic or polysiloxyl or organoboron polymers, the resulting compound can be used in the reduction step and easily separated from the final product by filtration. The structures of these polymers may vary. However, as an illustration, the polymer of Example 6 is believed to have, as the repeating unit, the form

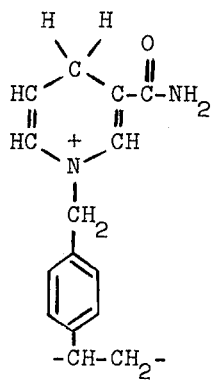

The molecular weights of the polymers used in this connection may range to over 4 million. In Examples 6 and 7, the cross-linked polystyrene is understood to consist of polymers having molecular weights of about 500,000; 1 million and up to 1.5 million. Thus R'' of the aforesaid structure may have up to 300,000 carbon atoms, preferably, for polymeric groups, from 20 to 100,000. As indicated previously, when R'' is a non-polymeric organic radical, it may contain from one to 40 carbon atoms, and preferably one to 20.

Many of the reaction products of this invention are optically active alcohols useful as industrial chemicals, intermediates, food additives, medicines and the like which can be obtained in high yields. Other alcohols have known industrial utility.

The scope of this invention is not considered to be limited to any specific description disclosed herein, except as limited by the following claims:

I claim:

1. A process of reducing carbonyl compounds comprising reacting an alpha-keto acid compound with a heterocyclic nitrogen compound containing a reduced pyridine group in the presence of a polyvalent metal ion of a metal selected from the group consisting of Groups IIB, IVA, VIIB and VIII of the Periodic Table, said reaction being carried out at a pH of from about 4 to about 10.

2. The process of claim 1 wherein the carbonyl compound has the formula

wherein R is selected from the group consisting of hydrogen and alkyl, aryl, aralkyl, alkaryl, cycloalkyl, carboxy derivatives thereof and carboxy, having from one to 40 carbon atoms, R' is carboxy or the alkali or alkaline earth metal salt thereof and X is oxygen.

3. The process of claim 1 wherein the alpha-keto acid compound is selected from the group consisting of benzoylformic acid, pyruvic acid, alpha-keto succinic acid and alpha-keto glutaric acid.

4. The process in accordance with claim 1 wherein a carbonyl compound selected from the group consisting of pyruvic acid and the alkali metal salts thereof is reacted with a heterocyclic nitrogen compound containing a reduced pyridine group in the presence of a polyvalent metal ion of metals selected from the group consisting of Groups IIB, IVA, VIIB and VIII of the Periodic Table and the product is lactic acid.

5. The process of claim 4 wherein the reaction takes place in the presence of a proton.

6. The process of claim 4 wherein the heterocyclic nitrogen compound is a dihydronicotinamide.

7. The process of claim 6 wherein the dihydronicotinamide is the reduced coenzyme beta-NADH and the product is an optically active lactic acid.

8. The process of claim 4 wherein the metal ion is selected from the group consisting of nickel, zinc, cadmium, cobalt, tin and manganese ions.

9. The process of claim 1 wherein the reduced pyridine has a structure selected from the group consisting of

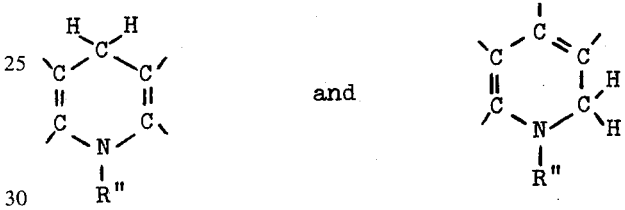

wherein R'' is selected from the group consisting of hydrogen, hydrocarbyl, hydrocarbon polymers and substituted derivatives thereof having atoms of oxygen, nitrogen, sulfur, silicon, phosphorus and boron, and R'' may be part of a polymeric chain, said structures shown representing repeating units of said chain, and the dangling valences are individually selected from the group consisting of the same group as for R'' and members of a fused second ring where attached to adjacent carbon atoms.

10. The process of claim 9 wherein R'' is selected from the group consisting of hydrogen and polymeric hydrocarbyl having a molecular weight of up to 4 million, nonpolymeric hydrocarbyl having from one to about 40 carbon atoms, and the said substituted forms thereof.

11. The process of claim 10 wherein R'' is selected from the group consisting of hydrogen, alkyl, aryl, and heterocyclic derivatives thereof, having from one to 40 carbons.

12. The process of claim 9 wherein one of the dangling valences is an amido group.

13. The process of claim 9 wherein the reduced pyridine is a dihydronicotinamide.

14. The process of claim 13 wherein the dihydronicotinamide is the reduced coenzyme beta-NADH.

15. The process of claim 13 wherein the dihydronicotinamide is 1-benzyl-dihydronicotinamide.

16. The process of claim 10 wherein R'' is a polymeric radical selected from the group consisting of polyolefinc, polysiloxyl and organoboronyl containing at least one reduced pyridine group attached thereto.

17. The process of claim 16 wherein the reduced pyridine is part of a polymer attached to a poly(styryl) molecule.

18. The process of claim 1 wherein the reaction takes place in the presence of a proton-supplying liquid medium.

19. The process of claim 18 wherein the liquid medium is selected from the group consisting of water, alcohol and acid.

20. The process of claim 1 wherein the metal ion is selected from the group consisting of nickel, zinc, cadmium, cobalt, tin and manganese ions.

* * * * *